Feb. 13, 1934.  A. C. LINDGREN ET AL  1,946,655
STRAW WINDROWER FOR HARVESTER-THRESHERS
Filed Oct. 26, 1932  2 Sheets-Sheet 1
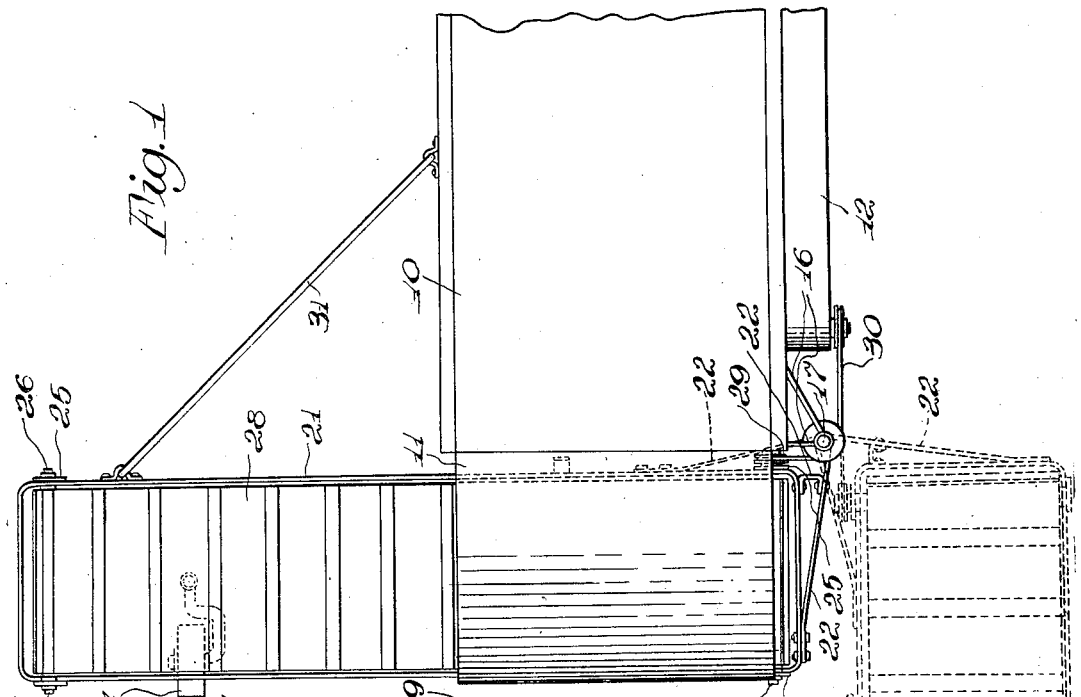
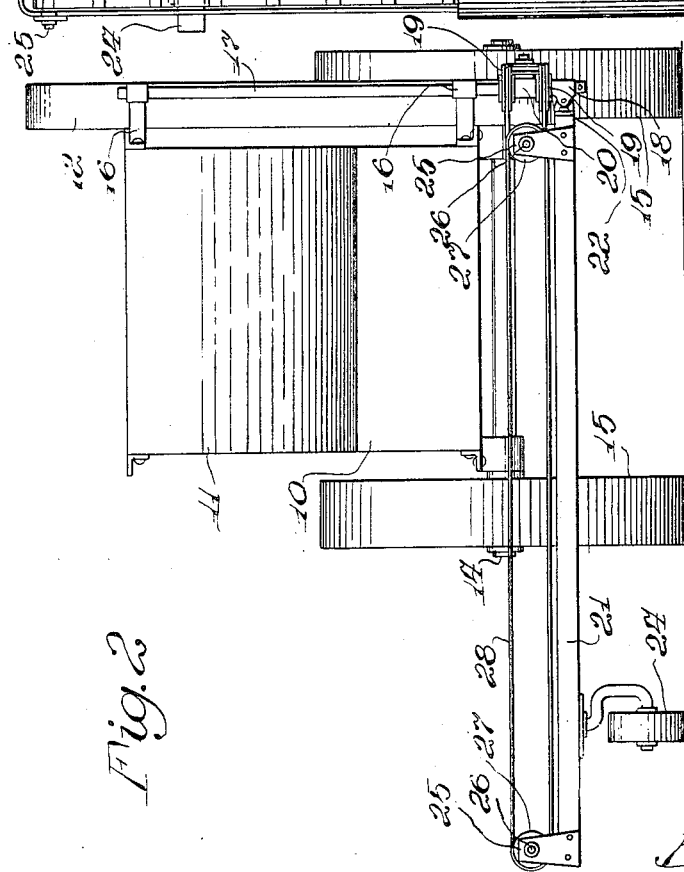

Feb. 13, 1934.  A. C. LINDGREN ET AL  1,946,655
STRAW WINDROWER FOR HARVESTER-THRESHERS
Filed Oct. 26, 1932  2 Sheets-Sheet 2

Inventors
Alexius C. Lindgren
Clemma R. Raney
By W. P. Doolittle
Atty

Patented Feb. 13, 1934

1,946,655

UNITED STATES PATENT OFFICE 1,946,655

STRAW WINDROWER FOR HARVESTER-THRESHERS

Alexus C. Lindgren, Chicago, and Clemma R. Raney, Riverside, Ill., assignors to International Harvester Company, a corporation of New Jersey Application October 26, 1932. Serial No. 639,724

12 Claims. (Cl. 56—122)

The invention relates to a straw windrowing attachment for harvester threshers.

Such attachments are located at the straw discharge end of the harvester thresher to catch the straw coming out of the thresher part and to move it in a manner to accumulate it in windrows, as the harvester thresher travels along. Accordingly, the straw can subsequently be picked up with a hay loader, or other pick-up device, to be gathered and stored for various farm uses, where it is desired to save and use the straw, rather than have such straw scattered onto the field directly from the harvester thresher to be plowed under for fertilizer.

The objects of the presents invention are to provide such a windrower which will be foldingly or hingedly connected to the rearward end of the thresher body for the purpose of making the windrower inactive in trailing position and active to lay the windrow stubblewardly of the harvester thresher in a transverse position, which is substantially at a right angle to the said trailing position.

Another object is to provide a machine that is capable of laying a double windrow, that is one windrow directly on top of a previously laid windrow.

Another object is to provide such an attachment supported on its own wheel carriage so as not to add any load to the harvester thresher for which it was not designed to carry.

Other objects will become apparent to those skilled in this art as the disclosure is more fully made.

Briefly, such objects are achieved in the form of the invention herein illustrated by way of example, in which form the machine or attachment comprises an elongated frame carrying an endless, apron type conveyer, said frame at one corner being quickly attachable to a rear point on the thresher part of the harvester thresher for hinging or folding movement, so that the entire frame may be swung through a horizontal plane to move the attachment from a longitudinal trailing position to a transverse position with the conveyer discharging in a stubbleward direction. The end of the frame remote from said hinge is carried on a caster wheel to make such swinging movement of the frame easy. Through the medium of the folding arrangement mentioned, a double windrow can be laid, as follows: When the first round is made, the attachment trails longitudinally behind the harvester thresher and to one side of the straw discharge end of the thresher, so that the straw will drop directly down onto the field in windrow formation. On the next or succeeding round of the harvester thresher, the windrowing attachment is folded ahead so that its conveyer is transversely disposed in a stubbleward direction, a portion thereof lying directly under the straw discharge end of the thresher part, to catch or receive the straw and convey it transversely in a stubbleward direction the proper distance to discharge straw from said second round onto the first formed windrow to form a double windrow, as stated. So on, alternating on every other round the attachment is trailed, and then folded, to form a double windrow.

In the accompanying sheets of drawings illustrating a practicable embodiment of the invention,—

Figure 1 is a top plan view of the rear end of the thresher part of a harvester thresher showing the improved straw windrowing attachment connected to be drawn at the rear end of the thresher part, the full line portion showing the windrower in operative position, and the dotted line position showing it in inactive position;

Figure 2 is a rear view of the full line showing in Figure 1, showing the attachment in its transverse or operative windrowing position; and, Figure 3 is a general side elevational view of the harvester thresher and attachment in operative windrowing position.

Figure 3:
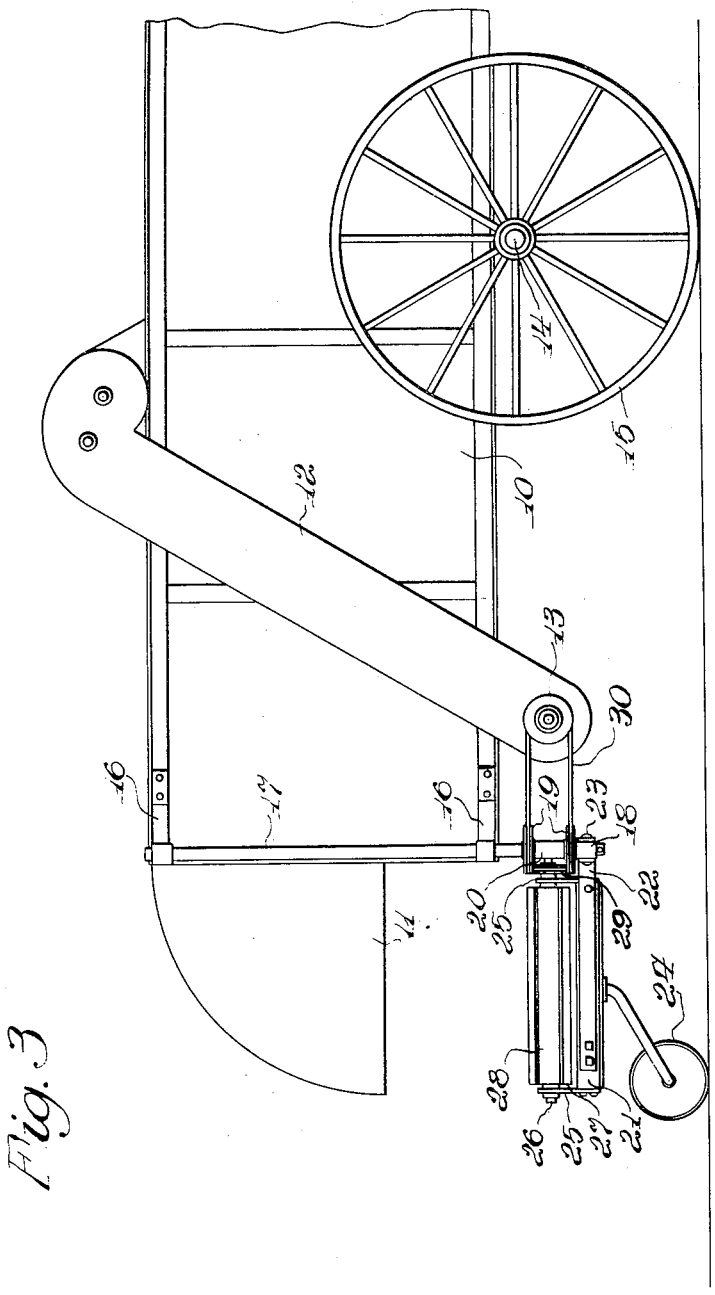

The harvester thresher shown may be of any standard type and is herein represented by the thresher body or part 10 having the usual straw discharging hood 11 at its rear end. The body also carries at its grainward side an elevator having at its lower end a transverse shaft 12 which herein is extended laterally out of the elevator housing to mount exteriorly of said housing, a pully wheel 13. The thresher 10 is supported in the usual way on a transverse axle 14 carried in wheels 15.

At the top and bottom points, the rear right hand, or grainward, corner of the thresher body 10 carries brackets 16 for supporting a non-turnable, vertical standard 17, which at its lower end is projected downwardly below the bottom of the body 10, as shown in Figure 3. This lower end of the standard 17 carries a loose, turnable sleeve 18 and thereabove, two, spaced, loose, turnable pulley wheels 19 separated by a spacer 20, also on the standard 17.

The windrowing attachment embodies an elongated, or rectangularly shaped frame 21, which at one corner carries braces 22 converging at an angle, said angle serving as a point for pivotal connection to the sleeve 18 by means of a horizontal hinge pin 23. Thus, the frame 21 is connected in effect by a universal joint, or two way hinge, to the standard 17 for folding movement in a horizontal plane, and floating movement vertically. Said frame, at a point near its end remote from its connection to the standard 17, is carried on a castering wheel support 24.

At each corner, the frame 21 is provided with an upstanding bracket 25, said brackets being arranged in aligned pairs to serve as journals for a pair of shafts 26 arranged one at each end across the frame. These shafts carry the usual rollers 27 for mounting an endless, slotted, apron type of conveyer 28. That shaft 26 nearest the standard 17 is extended out from the frame a distance to carry a fast pulley wheel 29. A belt 30 is connected between the pulleys 13 and 29 to drive the inner roller 27 from the elevator drive shaft 12 to drive the endless conveyer 28, the other roller 27 at the free end of the frame 21 being a mere idler roller. The pulleys 19 are guide sheaves for the endless drive belt 30, as shown. A rod 31 is used to hold the attachment in windrowing position, as shown in Figure 1. The use and operation of the improved straw windrowing attachment for harvester threshers will now be described.

The attachment is supported at one end by the caster wheel 24 and at the other end by being connected by the hinge pin 23 to the sleeve 18 at the lower end of the standard 17 carried by the harvester thresher body 10. During the first round of the harvester thresher, the brace rod 31 willl be disconnected from the body 10 of the attachment to free the same, whereupon, due to the forward movement of the harvester thresher, the windrowing attachment will automatically swing rearwardly on its caster wheel 24, and about sleeve 18 on the standard 17 to the dotted line position shown in Figure 1. In this position the windrower trails in a longitudinal line, to one side, grainwardly of the straw dump hood 11 at the rear end of the thresher part 10. The caster wheel 24, of course, follows in the line of draft, and the hinge pin 23 permits the necessary flexibility for travel over ground irregularities. In this position the windrower is inactive and the straw is discharged by the hood deflector 11 onto the ground along a path straddled by the two wheels 15. In this position rod 31 will be carried by the frame 21 in the manner shown in the dotted lines in Figure 1. Of course, the belt 30 is operative to drive the conveyer 28 even in this inactive position of the windrower. If it is desired to disconnect the conveyer drive at this time, the belt 30 can be easily slipped off the pulley 13.

When the first round has been made by the harvester thresher, the attachment is swung through a horizontal arc of approximately 90 degrees where the same is now disposed transversely, as shown in Figure 1 in the full lines, and extending stubblewardly with the grainward end of the conveyer disposed directly underneath the hood deflector 11, where it receives the straw therefrom. The belt 30, of course, is placed in position to drive the conveyer, so that the straw is moved transversely to be discharged onto the single windrow laid in the first round of the harvester thresher, it being understood, of course, that the length of the conveyer must be predetermined to cause discharge of the second round straw onto the first round windrow. Thus, may be formed a double straw windrow. The rod 31 must, of course, be reconnected to the side of the thresher body to maintain the windrower in proper position. The hinge pin 23 is effective in the transverse position of the windrower to permit flexibility for floating movement over rough and uneven ground.

In continuing the windrowing operation on alternating rounds of the harvester thresher, the attachment must be folded and unfolded in the manner described, so that a double straw windrow will be laid to simplify the gathering or picking up operation.

From this disclosure it will now be apparent that an improved device of the kind described has been provided for the purposes stated, and that the same achieves all of the desirable objects heretofore recited.

It is the intention to cover all such changes and modifications of the form herein shown which do not depart from the spirit and scope of the invention as defined in the appended claims.

What is claimed is:

1. A straw windrowing attachment for harvester threshers having a longitudinal thresher part discharging straw at its rear end, said attachment embodying an elongated frame adapted to be connected to the rear of the thresher part by means enabling said frame to be positioned lengthwise in the line of draft clear of the discharging straw or in a position transverse thereto to receive such discharging straw.

2. A straw windrowing attachment for harvester threshers having a longitudinal thresher part discharging straw at its rear end, said attachment embodying an elongated frame carried at one end on a caster wheel and adapted to have its other end connected to a rear portion of the thresher part by means enabling said frame to be positioned lengthwise in the line of draft clear of the discharging straw or in a position transverse thereto to receive such discharging straw.

3. A straw windrowing attachment for harvester threshers having a longitudinal thresher part with a straw deflecting hood at the rear thereof, said attachment comprising an elongated frame carrying a conveyer, a wheel supporting one end of the attachment, and means adapted to connect the other end of the attachment to the thresher part for folding horizontal movement, whereby the attachment may be arranged longitudinally in the line of draft offset from the hood and clear of the discharging straw, or in a transverse position beneath the hood to receive the straw therefrom and extending a distance stubblewardly of the hood.

4. A straw windrowing attachment for harvester threshers having a longitudinal thresher part with a straw deflecting hood at the rear thereof, said attachment comprising an elongated frame carrying a conveyer, a caster wheel supporting one end of the attachment, means adapted to connect the other end of the attachment to the rear grainward corner of the thresher part for folding horizontal movement, whereby the attachment may be arranged longitudinally in the line of draft but offset from the hood and clear of the discharging straw, or in a transverse position beneath the hood to receive the straw therefrom, said frame in the transverse position extending a distance stubblewardly of the hood, and means to drive the conveyer to move the straw stubblewardly.

5. A straw windrowing attachment for harvester threshers having a longitudinal thresher part with a straw deflecting hood at the rear thereof, said attachment comprising an elongated frame carrying a conveyer, a caster wheel supporting one end of the attachment, and means adapted to connect the other end of the attachment to the thresher part for folding horizontal movement, whereby the attachment may be arranged longitudinally in the line of draft offset from the hood and clear of the discharging straw, or in a transverse position beneath the hood to receive the straw therefrom and extending a distance stubblewardly of the hood, said connecting means including a horizontal hinge to allow the wheel carried frame to float in its travel over uneven ground.

6. A straw windrowing attachment for harvester threshers having a longitudinal thresher part with a straw deflecting hood at the rear thereof, said attachment comprising an elongated frame carrying a conveyer, a wheel supporting one end of the attachment, means adapted to connect the other end of the attachment to the thresher part for folding horizontal movement, whereby the attachment may be arranged longitudinally in the line of draft clear of the discharging straw, or in a transverse position beneath the hood to receive the straw therefrom and extending a distance stubblewardly of the hood, and means to drive said conveyer from a driven element of the thresher part.

7. A straw windrowing attachment for harvester threshers having a longitudinal thresher part with a straw deflecting hood at the rear thereof, said attachment comprising an elongated frame carrying a conveyer, a wheel supporting one end of the attachment, means adapted to connect the other end of the attachment to the thresher part for folding horizontal movement and for floating vertical movement, whereby the attachment may be arranged longitudinally in the line of draft clear of the discharging straw, or in a transverse position beneath the hood to receive the straw therefrom, and means to drive the conveyer in a stubbleward direction.

8. A straw windrowing attachment for harvester threshers having a longitudinal thresher part with a straw deflecting hood at the rear thereof and an elevator at its side, said attachment comprising an elongated frame carrying a conveyer, a wheel supporting one end of the attachment, means adapted to connect the other end of the attachment to the thresher part for folding horizontal movement, whereby the attachment may be arranged longitudinally in the line of draft clear of the discharging straw, or in a transverse position beneath the hood to receive the straw therefrom and extending a distance stubblewardly of the hood, and means to drive the conveyer from a driving element of said elevator.

9. A straw windrowing attachment for harvester threshers having a longitudinal thresher part with a straw deflecting hood at the rear thereof and an elevator at its side, said attachment comprising an elongated frame carrying a conveyer, a caster wheel supporting one end of the attachment, means adapted to connect the other end of the attachment to the thresher part for folding horizontal movement and for floating vertical movement, whereby the attachment may be arranged longitudinally in the line of draft offset from the hood and clear of the discharging straw, or in a transverse position beneath the hood to receive the straw therefrom and extending a distance stubblewardly of the hood, and means to drive the conveyer in the direction of the wheel supported end of the frame from a movable element of the elevator.

10. A straw windrowing attachment for harvester threshers having a longitudinal thresher part with a straw deflecting hood at the rear thereof and an upright support at the rear grainward corner of said thresher part, said attachment comprising an elongated frame carrying a conveyer, a ground support for one end of the attachment, a two-way hinge to connect the other end of the attachment to the lower end of the support on the thresher part for folding horizontal movement and for floating vertical movement, whereby the attachment may be arranged longitudinally in the line of draft offset from the hood and clear of the discharging straw, or in a transverse position beneath the hood to receive the straw therefrom and extending a distance stubblewardly of the hood, a wheel on the attachment for driving the conveyer, idler wheels on the upright, and a driving belt cooperating with said wheels and driven from an element on the thresher to drive the conveyer.

11. A straw windrowing attachment for harvester threshers having a longitudinal thresher part discharging straw at its rear end, said attachment comprising a frame, a conveyer on the frame, means to drive the conveyer, and hinge means for connecting the frame to the thresher part whereby the frame may be located in either a transverse position or in a longitudinal position relative to the thresher part clear of the discharging straw.

12. A straw windrowing attachment for harvester threshers having a longitudinal thresher part with a straw discharging hood at the rear thereof, brackets at the upper and lower rear grainward corner of the thresher part, a vertical support non-turnably carried by said brackets, said attachment comprising a rectangular frame carrying a conveyer, a ground support for one end of the attachment, a two-way hinge to connect the other end of the attachment to the lower end of the vertical support for folding horizontal movement and for floating movement, whereby the attachment may be arranged longitudinally in the line of draft offset from the hood and clear of the discharging straw or in a transverse position beneath the hood to receive the straw therefrom and extending a distance stubblewardly of the hood, a wheel on the attachment for driving the conveyer, idler wheels on the lower end of the vertical support, and a driving belt cooperating with said wheels and driven from an element of the thresher part to drive the conveyer only in a direction toward the ground support for the attachment.

ALEXUS C. LINDGREN.
CLEMMA R. RANEY.